United States Patent
Kim et al.

(10) Patent No.: US 8,446,867 B2
(45) Date of Patent: May 21, 2013

(54) METHOD OF CONTROLLING UPLINK POWER IN WIRELESS COMMUNICATION SYSTEM

(75) Inventors: Dong Cheol Kim, Anyang-si (KR); Seung Hee Han, Anyang-si (KR); Min Seok Noh, Anyang-si (KR); Jin Sam Kwak, Anyang-si (KR); Yeong Hyeon Kwon, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 420 days.

(21) Appl. No.: 12/738,243

(22) PCT Filed: Oct. 16, 2008

(86) PCT No.: PCT/KR2008/006102
§ 371 (c)(1),
(2), (4) Date: Apr. 15, 2010

(87) PCT Pub. No.: WO2009/051412
PCT Pub. Date: Apr. 23, 2009

(65) Prior Publication Data
US 2010/0208685 A1    Aug. 19, 2010

(30) Foreign Application Priority Data
Oct. 16, 2007  (KR) .................. 10-2007-0104063

(51) Int. Cl.
*H04W 4/00* (2009.01)
(52) U.S. Cl.
USPC ............ 370/329; 370/328; 370/310; 370/311

(58) Field of Classification Search
None
See application file for complete search history.

(56) References Cited

U.S. PATENT DOCUMENTS

| | | | |
|---|---|---|---|
| 2005/0026642 A1* | 2/2005 | Lee et al. .................. | 455/522 |
| 2007/0265026 A1* | 11/2007 | You et al. .................. | 455/522 |
| 2009/0196192 A1* | 8/2009 | Lim et al. .................. | 370/252 |

OTHER PUBLICATIONS

Cho et al., "Corrections on Open Loop Power Control for Uplink", IEEE 802.16 Broadband Wireless Access Working Group, IEEE C802.16e-05/072, pp. 0-4, Jan. 10, 2005.
Joo et al., Open Loop Power Control for Uplink:, IEEE 802.16 Broadband Wireless Access Working Group, IEEE C802.16e-04/252r3, pp. 0-10, Sep. 2, 2004.

* cited by examiner

*Primary Examiner* — Hassan Phillips
*Assistant Examiner* — Anez Ebrahim
(74) *Attorney, Agent, or Firm* — Birch, Stewart, Kolasch & Birch, LLP

(57) ABSTRACT

A method of controlling uplink power in a wireless communication system includes receiving a power control offset with respect to a data burst including user data from a base station, receiving a power control offset with respect to a control burst including control information from the base station, and controlling transmission power of the data burst and transmission power of the control burst according to the power control offset with respect to the data burst and the power control offset with respect to the control burst.

4 Claims, 3 Drawing Sheets

[Fig. 1]
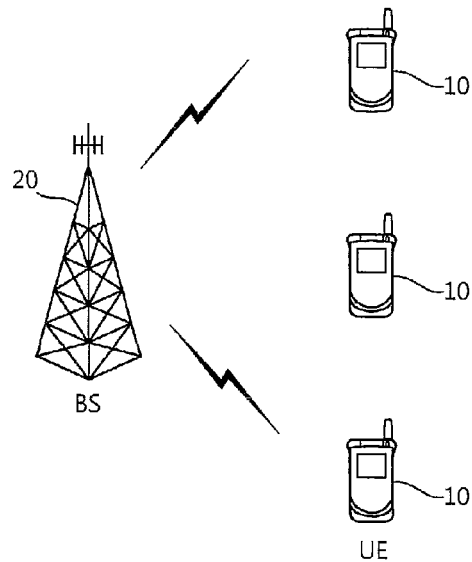
[Fig. 2]
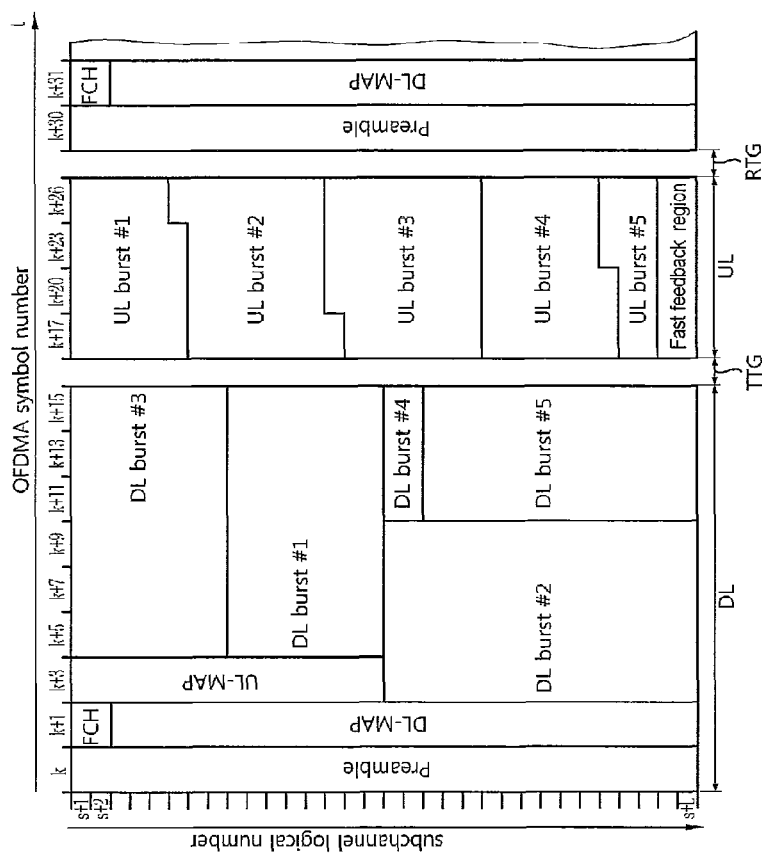

[Fig. 3]
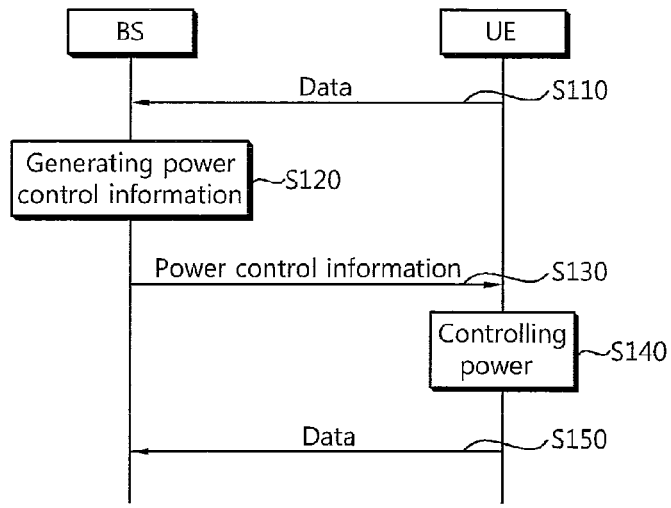
[Fig. 4]

[Fig. 5]
[Fig. 6]
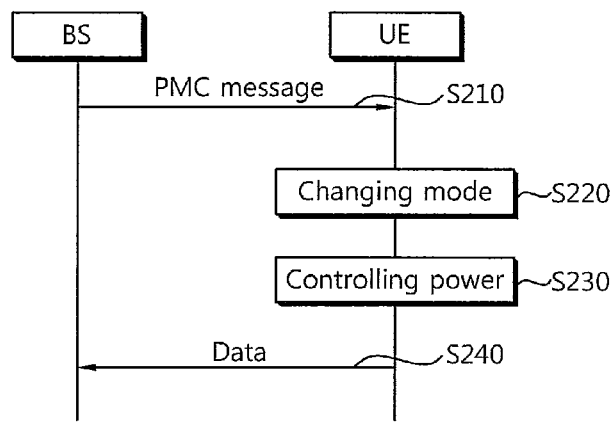

METHOD OF CONTROLLING UPLINK POWER IN WIRELESS COMMUNICATION SYSTEM

TECHNICAL FIELD

The present invention relates to wireless communications and, more particularly, to a power control method of transmitting data with proper transmission power.

BACKGROUND ART

A next-generation multimedia wireless communication system, which is being actively studied, is required to process various information such as images, wireless data, or the like, at a high data transmission rate, beyond the voice-oriented services provided at an early stage.

Thus, recently, orthogonal frequency division multiplexing (OFDM) exerting a high data rate receives much attention. The OFDM is a multi-carrier modulation scheme that divides a frequency band into a plurality of orthogonal subcarriers to transmit data. The OFDM can reduce an inter-symbol interference at a low complexity. The OFDM converts serially inputted data symbols into the N parallel data symbols, includes them in the N separated subcarriers, and transmits the same. The subcarriers maintain orthogonality in a frequency domain. The respective orthogonal channels experience mutually independent frequency selective fading, and the intervals of transmitted symbols is lengthened to minimize the inter-symbol interference. Orthogonal frequency division multiple access (OFDMA) refers to a multi-access scheme accomplishing multiple accesses by independently providing portions of available subcarriers to each user in a system using the OFDM as a modulation scheme. The OFDMA provides frequency resources called subcarriers to each user, and in general, the respective frequency resources are independently provided to multiple users so as not to overlap with each other. That is, frequency resources are mutually exclusively allocated to the users.

The wireless communication system has a cell structure to effectively configure a system. A cell refers to a zone obtained by dividing a wide area into smaller zones to effectively use frequency of cell. In general, a base station (BS) is installed at the center of the cell to relay a user equipment (UE). The cell refers to a service region provided by a single BS.

The wireless communication system uses a power control scheme to reduce a path loss according to the distance between a base station and a UE and an inter-cell interference by an adjacent cell. The power control scheme is adjusting transmission power to transmit data at the lowest power level while maintaining quality of service (QoS) of the wireless communication system. In particular, UEs located near a cell boundary in the multi-cell environment are much affected by the path loss and the inter-cell interference, so in transmitting data, the UEs should determine proper transmission power not to cause degradation of QoS by a path loss while not interfering with its adjacent cell.

The data transmitted by the UE to the BS may include user data and/or control information. A channel for transmitting the control information is called a control channel. The control information may include various types such as an ACK (Acknowledgement)/NACK (Negative-Acknowledgement) signal, a channel quality indicator (CQI), a precoding matrix indicator (PMI), a rank indicator (RI), or the like. The user data is transmitted as data, not control information, through a data channel. The control channel and the data channel may occupy different frequency domains or different time domains in the overall resource domain of the wireless communication system, so the control channel and the data channel may undergo different channel environments. If power control is performed without discriminating the control channel and the data channel, the efficiency of power control scheme may be lowered because of inaccurate determination of transmission power.

Thus, a method of transmitting data with accurate transmission power by discriminating the control channel and the data channel is required.

DISCLOSURE OF INVENTION

Technical Problem

The present invention provides a power control method for transmitting data with appropriate transmission power to thereby reduce a path loss or an inter-cell interference.

Technical Solution

In an aspect, a method of controlling uplink power in a wireless communication system includes receiving a power control offset with respect to a data burst including user data from a base station, receiving a power control offset with respect to a control burst including control information from the base station, and controlling transmission power of the data burst and transmission power of the control burst according to the power control offset with respect to the data burst and the power control offset with respect to the control burst.

In another aspect, a method of controlling uplink power in a wireless communication system includes receiving a power control mode change message indicating a power control mode is changed from a closed-loop power control scheme to a open-loop power control scheme or from the open-loop power control scheme to the closed-loop power control scheme, changing the power control mode according to the power control mode change message, and controlling transmission power of a data burst and transmission power of a control burst according to the power control mode change message.

In another aspect, a method of controlling uplink power in a wireless communication system includes receiving data including user data or control information from a user equipment, transmitting power control information about transmission power of user data to be transmitted later by the user equipment, and transmitting power control information about transmission power of control information to be transmitted later by the user equipment.

Advantageous Effects

Transmission power of signals can be controlled by the control burst and the data burst that occupy different frequency domains and/or time domains in the radio resource domain, and thus, the transmission power of signal can be more accurately controlled and an influence of an inter-cell interference or a path loss can be reduced to thus improve quality of service of the wireless communication system.

BRIEF DESCRIPTION OF THE DRAWINGS

FIG. 1 is a schematic block diagram showing one example of a wireless communication system.

FIG. 2 is a drawing illustrating an example of a frame structure.

FIG. 3 is a flow chart illustrating the process of a power control method according to one embodiment of the present invention.

FIG. 4 is a view for explaining a method for determining transmission power with respect to a control burst from a data burst according to an embodiment of the present invention.

FIG. 5 is a view for explaining a method for determining transmission power with respect to a data burst from a control burst according to an embodiment of the present invention.

FIG. 6 is a flow chart illustrating the process of a power control method according to another embodiment of the present invention.

MODE FOR THE INVENTION

FIG. 1 is a schematic block diagram showing one example of a wireless communication system. The wireless communication system can be widely deployed to provide a variety of communication services, such as voices, packet data, etc.

Referring to FIG. 1, the wireless communication system includes base stations (BS) 20 and user equipments (UE) 10. The UE 10 may be fixed or have mobility, and may be referred to as another terminology, such as a mobile station (MS), a user terminal (UT), a subscriber station (SS), a wireless device, etc.

The BS 20 generally refer to a fixed station that communicates with the UE 10 and may be called another terminology, such as a node-B, a base transceiver system (BTS), an access point, etc. There are one or more cells within the coverage of the BS 20.

Hereinafter, downlink refers to communication from the BS 20 to the UE 10, and uplink refers communication from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

There is no restriction on the multiple access scheme used in the wireless communication system. The multiple access scheme may be based on code division multiple access (CDMA), time division multiple access (TDMA), frequency division multiple access (FDMA), single-carrier FDMA (SC-FDMA), orthogonal frequency division multiple access (OFDMA), or other well-known modulation schemes.

FIG. 2 shows an example of a frame structure. The frame refers to a data sequence during a fixed time period used by physical specifications. It may refer to 8.4.4.2 paragraph of "Part 16: Air Interface for Fixed Broadband Wireless Access Systems" of IEEE standards 802.16-2004 (reference document 1).

Referring to FIG. 2, the frame includes a downlink frame and an uplink frame. Time division duplex (TDD) refers to a method in which uplink and downlink transmissions share the same frequency but occur at each different time. The downlink frame temporally goes ahead of the uplink frame. The downlink frame includes a preamble, a frame control header (FCH), a DL (Downlink)-MAP, a UL (Uplink)-MAP, a burst region, starting in this order. A guard time for discriminating the uplink frame and the downlink frame is inserted into a middle portion of the frame (i.e., between the downlink frame and the uplink frame), and to a final portion (after the uplink frame). A transmit/receive transition gap (TTG) refers to a gap between the downlink burst and the subsequent uplink burst. A receive/transmit transition gap (RTG) refers to a gap between the uplink burst and a subsequent downlink burst.

The preamble is used for initial synchronization, cell search, frequency offset, and channel estimation between a base station and a UE. The FCH includes the length of a DL-MAP message and coding information of the DL-MAP message.

The DL-MAP is a region on which the DL-MAP message is transmitted. The DL-MAP message defines an access of a downlink channel. The DL-MAP message includes a configuration change count of a downlink channel descriptor (DCD) and a base station identifier (ID). The DCD describes a downlink burst profile applied to a current map. The downlink burst profile refers to characteristics of a downlink physical channel, and the DCD is periodically transmitted by the base station via a DCD message.

The UL-MAP is a region on which a UL-MAP message is transmitted. The UL-MAP message defines an access of an uplink channel. The UL-MAP message includes a configuration change count of a uplink channel descriptor (UCD) and a valid start time of uplink allocation defined by the UL-MAP. The UCD describes an uplink burst profile. The uplink burst profile refers to characteristics of an uplink physical channel, and the UCD is periodically transmitted by the base station via a UCD message.

A fast feedback region is included in the uplink burst region of the OFDM frame. The fast feedback region is used to transmit information requested for a fast response from the base station. The fast feedback region may be used to transmit a CQI (Channel Quality Indicator). The position of the fast feedback region is determined by the UL-MAP. The position of the fast feedback region may be fixed or may be changed within the OFDM frame.

Hereinafter, a slot is a minimum available data allocation unit and defined as time and a subchannel. The number of subchannels depends upon the size of FFT and time-frequency mapping. Subchannels include a plurality of subcarriers. The number of sub-carriers per subchannel differs depending on permutations. Permutation refers to mapping of a logical subchannel to a physical subcarrier. In full usage of subchannels (FUSC), a subchannel includes 48 subcarriers, and in a partial usage of subchannels (PUSC), a subchannel includes 24 or 16 subcarriers. A segment refers to at least one subchannel set.

Data of a physical layer is mapped to a physical subcarrier through two steps.

In first step, data is mapped to at least one data slot in at least one logical subchannel. In a second step, each logical subchannel is mapped to physical subcarriers. This is called permutation. Reference document 1 discloses FUSC, PUSC, optional-FUSC (O-FUSC), adaptive modulation and coding (AMC), or the like. A set of OFDM symbols using the same permutation is called a permutation zone, and a single frame includes at least one permutation zone.

The FUSC and the O-FUSC are used only for downlink transmission. The FUSC includes a single segment including every subchannel group. Each subchannel is mapped to a physical subcarrier distributed in the entire physical channels. This mapping changes for each OFDM symbol. A slot includes a single subchannel in a single OFDM symbol. The O-FUSC has a different pilot allocation method from that of the FUSC.

The PUSC is used for both downlink transmission and uplink transmission. In downlink, respective physical channels are divided into clusters each having 14 contiguous subcarriers in two OFDM symbols. The physical channels are mapped to six groups. In each group, pilot is allocated to each cluster and is in a fixed position. In the uplink, each subcarrier may include a plurality of tiles including four contiguous physical subcarriers on three OFDM symbols. Each subchannel includes six tiles. Pilot is allocated to the corner of each tile. The O-PUSC is used only for uplink transmission, and each tile includes three continuous physical subcarriers on three OFDM symbols. Pilot is allocated to the center of each tile.

FIG. 3 is a flow chart illustrating the process of a power control method according to one embodiment of the present invention.

Referring to FIG. 3, a user equipment (UE) transmits data to a base station (BS) (S110). The data may include user data and/or control information. The control information may include various types of information such as an ACK/NACK signal, a CQI, a PMI, an RI, or the like. The ACK/NACK signal is a response to a downlink data transmission. The CQI indicates a downlink channel quality and may have various forms such as an signal-to-interference plus noise ratio (SINR), an modulation and coding scheme (MCS) level, a data rate indicator, an received signal strength indicator (RSSI), or the like. The PMI and the RI indicate precoding information and rank information of a multiple input multiple output (MIMO) system using a plurality of transmit/receive antennas.

The overall radio resources may be divided into a data region and a control region. User data and/or control information can be included in the data region, and control information can be included in the control region. A data region to which the same permutation is applied is called a data burst, and a control region to which the same permutation is applied is called a control burst. A single data burst may carry user data of a single user or user data of multiple users. A single control burst may carry control information about a single user or control information about multiple users. The data burst and the control burst may occupy different frequency domains and/or different time domains.

The BS generates power control information (S120). The BS may generate power control information with respect to a data burst or a control burst of a particular section of data transmitted by the UE. The BS may measure an accurate power value of the signal received from the UE, and generate power control information by comparing the power value of the reception signal with a reference level. For example, an SINR received from the UE is higher than a target SINR, the BS may generate power control information to lower the transmission power of the UE, whereas if the reception SINR is lower than the target SINR, the BS may generate power control information to increase the transmission power of the UE.

The BS transmits the power control information to the UE (S130). The power control information may include a power correction term with respect to each of the data burst and the control burst. Table 1 shows one example of power control information.

TABLE 1

| Syntax | Note |
|---|---|
| Power_Control_IE{ | |
| Extended UIUC | |
| Length | |
| Power Control$_{Data}$ | Power correction term with respect to data burst |
| Power Control$_{Control}$ | Power correction term with respect to control burst |
| Power measurement frame } | Power measurement frame for power control |

In Table 1, 'Power Control$_{Data}$' indicates a power correction term or power correction level with respect to a data burst, and 'Power Control$_{Control}$' indicates a power correction term or power correction level with respect to a control burst. The power correction term with respect to the data burst may be offset information instructing to increase or decrease transmission power of an uplink data burst by certain units. For example, the power correction term with respect to the data burst may instruct to increase or decrease transmission power of the data burst by some units, e.g., by 0.25 dB. The power correction term with respect to the control burst may be offset information for instructing to increase or decrease transmission power of the control burst by certain units. The power correction term with respect to the control burst may be indicated as a difference value with respect to the power correction term with respect to the data burst. Alternatively, the power correction term with respect to the control burst may be instructed to be increased or decreased by certain units, and the power correction term with respect to the data burst may be indicated as a difference value with respect to the power correction term with respect to the control burst.

If the data transmitted from the UE includes user data and control information, power of the data burst and that of the control burst are measured during a particular interval to obtain a power correction term with respect to the data burst and a power correction term with respect to the control burst. If, however, data transmitted from the UE includes only user data or only control information, power values should be measured during several frame intervals in order to obtain a power correction term with respect to the data burst and a power correction term with respect to the control burst. Table 2 shows one example power control information in case where a power correction term with respect to a data burst and a power correction term with respect to a control burst are obtained from different frames.

TABLE 2

| Syntax | Note |
|---|---|
| Power_Control_IE{ | |
| Extended UIUC | |
| Length | |
| Power Control$_{Data}$ | Power correction term with respect to data burst |
| Power Control$_{Control}$ | Power correction term with respect to control burst |
| Power measurement frame$_{Data}$ | Power measurement frame for power controlling power of data burst |
| Power measurement frame$_{Control}$ } | Power measurement frame for power controlling power of control burst |

In Table 2, 'Power measurement frame$_{Data}$' indicates a frame for which power measurement was performed to obtain a power correction term with respect to the data burst, and 'Power measurement frame$_{Control}$' indicates a frame for which power measurement was performed to obtain a power correction term with respect to the control burst.

The UE controls power of a transmission signal based on the power control information received from the BS (S140). The UE may determine transmission power of data to be transmitted later by applying the power correction value included in the power control information. Below Equation 1 shows one example of transmission power to be applied by the UE for a later data transmission.

MathFigure 1

$$P_{new(Control)} = P_{last} + (C/N_{new} - C/N_{last}) - (10 \log_{10}(R_{new}) - 10 \log_{10}(R_{last})) + \text{Offset}_{Control}$$

$$P_{new(Data)} = P_{last} + \text{Offset}_{Data} \quad \text{[Math.1]}$$

Equation 2 shows another example of transmission power to be applied by the UE for a later data transmission.

MathFigure 2

$$P_{new(Control)} = P_{last} + (C/N_{new} - C/N_{last}) - (10 \log_{10}(R_{new}) - 10 \log_{10}(R_{last})) + \text{Offset}_{Control}$$

$$P_{new(Data)} = P_{last} + (C/N_{new} - C/N_{last}) - (10 \log_{10}(R_{new}) - 10 \log_{10}(R_{last})) + \text{Offset}_{Data} \quad \text{[Math.2]}$$

Equation 3 shows still another example of transmission power to be applied by the UE for a later data transmission.

MathFigure 3

$$P_{new(Control)} = P_{last} + \text{Offset}_{Control}$$

$$P_{new(Data)} = P_{last} + \text{Offset}_{Data} \quad \text{[Math.3]}$$

Equation 4 shows yet another example of transmission power to be applied by the UE for a later data transmission.

MathFigure 4

$$P_{new(Control)} = P_{last} + \text{Offset}_{Control}$$

$$P_{new(Data)} = P_{last} + (C/N_{new} - C/N_{last}) - (10 \log_{10}(R_{new}) - 10 \log_{10}(R_{last})) + \text{Offset}_{Data} \quad \text{[Math.4]}$$

wherein $(.)_{last}$ is a factor applied from a previous data transmission, $(.)_{new}$ is a factor to be applied for a later data transmission, $P_{(Control)}$ is transmission power with respect to the control burst, $P_{(Data)}$ is transmission power with respect to the data burst, $C/N_{new}$ is a carrier-to-noise ratio with respect to a determined modulation method, $C/N_{last}$ is a carrier-to-noise ratio with respect to a previously used modulation method, $R_{new}$ is the number of repetitions with respect to the determined modulation method, $R_{last}$ is the number of repetitions with respect to the previously used modulation method, $\text{Offset}_{Control}$ is an accumulation of power correction terms with respect to the control burst, and $\text{Offset}_{Data}$ is an accumulation of power correction terms with respect to the data burst. The formulas for determining the transmission power to be applied for a later data transmission are merely examples and not limited. Different formulas may be applied according to a wireless communication system or channel characteristics. The formulas for determining transmission power may be previously determined according to systems. Alternately, the BS may designate a formula to be applied and inform the UE accordingly, as necessary.

The UE transmits data with the controlled transmission power (S150). The user data may be transmitted on the uplink data burst, and the control information may be transmitted on the uplink control burst. In this case, different transmission power may be applied for the data burst and the control burst. The user data and the control information may be transmitted each with different transmission power based on the power control information transmitted by the BS. Accordingly, by transmitting the data burst and the control burst, which may undergo different channel environments, with transmission power suitable for each channel environment, power can be more accurately controlled. Because power is controlled more accurately, an influence of inter-cell interference or a path loss can be reduced, and thus, quality of service (QoS) of the wireless communication system can be improved.

If the data transmitted by the UE to the BS is transmitted only with the data burst, the BS cannot measure the power value with respect to the control burst, making it difficult to determine power control information. Also, if the UE transmits only the control burst to the BS, the BS cannot measure the power value with respect to the data burst, so there would be a difficulty in determining power control information. Hereinafter, a method for determining transmission power with respect to the data burst and the control burst in these cases will now be described.

FIG. 4 is a view for explaining a method for determining transmission power with respect to a control burst from a data burst according to an embodiment of the present invention.

Referring to FIG. 4, only data burst is transmitted to uplink, a base station (BS) may determine transmission power with respect to the control burst by using a reception SINR value with respect to the data burst.

For example, it is assumed that a user equipment (UE) transmits only data bursts during the (n−3)th frame, (n−2)th frame, and (n−1)th frame, and transmits a control burst during the nth frame. Because the BS does not receive a control burst before the nth frame, it cannot directly obtain a power correction value with respect to the control burst nor inform the UE about it. In this case, the BS may indirectly obtain the power correction value with respect to the control burst by using the reception SINR value with respect to the data burst.

The BS can obtain the reception SINR from the received data bursts, and determine whether or not a target frame error rate (FER) of the control burst is satisfactory by using the reception SINR value. Namely, the BS may compare the reception SINR value with respect to the received data burst and a pre-set SINR value with respect to the target FER of the control burst, and determine a power correction value to increase or decrease transmission power of the control burst. For example, if the reception SINR value with respect to the received data burst is larger than the pre-set SINR value with respect to the target FER of the control burst, the BS can determine a power correction value to lower the transmission power of the control burst. If the reception SINR value with respect to the received data burst is smaller than the pre-set SINR value with respect to the target FER of the control burst, the BS can determine a power correction value to increase the transmission power of the control burst. When the BS informs the UE about the power correction value with respect to the control burst, the UE can control transmission power of the control burst in consideration of previously transmission power (Plast) a change in an modulation and coding scheme (MCS), or the like, based on the power correction value.

In general, the FER is a ratio of frames with an error to the total number of transmission frames, and the target FER is determined as a particular value to maintain the performance of the system. The target FER with respect to the control burst may be determined as a single value. If there is a single target FER with respect to the control burst, the BS may determine a power correction value based on an SINR value with respect to the single target FER, regardless of a type of a control signal included in the control burst. However, the target FER with respect to the control burst may have various values according to types of control signals included in the control burst. For example, the control burst may include various control signals such as a fast feedback channel for a fast response of uplink, hybrid automatic repeat request (HARQ) ACK/NACK, a radio resource allocation request (or bandwidth request), radio resource allocation information employing a peak to average power ratio (PAPR) reduction scheme, CDMA applied radio resource allocation information, or the like. Thus, the target FER with respect to the control burst may have different values according to the types of the control signals.

When the target FER with respect to the control burst is determined to have various values, the BS may determine a power correction term with respect to the control burst based on a target FER with the largest range in which a reception SINR is satisfied for the data burst, among SINRs with respect to various target FERs. When the BS informs the UE about the power correction term with respect to the control burst, the UE may control transmission power of the control burst based on the power correction term.

Meanwhile, if the BS knows a transmission power value of the data burst transmitted by the UE, it can obtain a power loss value by a difference between the transmission power value of the data burst and the reception SINR value. If an MCS level of the control burst is determined based on the reception SINR, the BS may inform the UE about the power loss value as a power correction value with respect to the control burst. The UE may control transmission power of the control burst based on the power loss value. In addition, in case of the control burst, a modulation type, a repetition factor, or the like, may be determined in a one-to-one manner according to codes designating each control burst. Namely, the BS may inform the UE about a code indicating the modulation type, the repetition factor, or the like, which is determined for each control burst. An AMC permutation may be applied for the data burst, for which an MCS level can be adaptively changed to be used according to a reception SINR.

FIG. 5 is a view for explaining a method for determining transmission power with respect to a data burst from a control burst according to an embodiment of the present invention.

Referring to FIG. 5, if only control burst is transmitted to uplink, a base station (BS) may determine transmission power with respect to a data burst by using a reception SINR value with respect to the control burst. This can be performed in the same manner as the method of determining the transmission power with respect to the control burst when only the data burst is transmitted to uplink in FIG. 4. Namely, the BS compares a reception SINR value with respect to the received control burst and an SINR value with respect to a target FER of the data burst, and determine a power correction value for increasing or lowering transmission power of the data burst, and informs a user equipment (UE) about the determined power correction value. Alternatively, the BS may obtain a power loss value according to a difference between the transmission power value of the control burst transmitted by the UE and the reception SINR value, and inform the UE about the power loss value as a power correction term with respect to the data burst. The UE can control transmission power with respect to the data burst based on the received power correction term.

In the above description, the power correction term with respect to the data burst and the power correction term with respect to the control burst are transmitted together, but it is merely an example. That is, the BS does not always necessarily transmit the power correction term with respect to the data burst and the power correction term with respect to the control burst together. For example, after receiving single power control information, the UE may transmit uplink data several times. In this case, the UE controls transmission power according to previously received power control information. However, if the BS determines power control information at each frame and informs about that, because the BS knows that data to be transmitted by the UE next time will be transmitted by a data burst or a control burst, the BS may include only one of the power correction term with respect to the data burst and the power correction term with respect to the control burst in the power control information and transmit the same.

A power control scheme may be divided into an open loop power control scheme and a closed loop power control scheme. The closed loop power control scheme is increasing or decreasing power according to a power control message transmitted from the BS. The open loop power control scheme is allowing the UE to directly determine transmission power based on various factors without receiving a direct up/down command from the BS. Of course, the UE receives required information from the BS. For example, the UE receives information about an interference level of uplink or a particular offset from the BS. In addition, the UE may receive more information from the BS as necessary. Based on those information, the UE determines the next transmission power. The power control method as explained above corresponds to the closed-loop power control scheme.

The channel environment of the UE moving fast changes very quickly, so power controlling by using the feedback information transmitted by the UE may rather bring about inaccurate results. Thus, it is necessary to control the transmission power of the UE by changing the power control mode from the closed-loop power control scheme to the open-loop power control scheme as necessary, and vice versa.

A method for controlling power for a case where power control mode is changed will now be described.

FIG. 6 is a flow chart illustrating the process of a power control method according to another embodiment of the present invention.

With reference to FIG. 6, when a power control mode is changed, a base station (BS) transmits a power control mode change (PMC) message to a user equipment (UE) (S210). The PMC message may indicate that the power control mode is changed from the closed-loop power control scheme to the open-loop power control scheme or from the open-loop power control scheme to the closed-loop power control scheme. Table 3 shows one example of the PMC message.

TABLE 3

| Syntax | Note |
|---|---|
| PMC message format{ | |
|   Management Message Type=64 | |
|   Power control mode change | 0b00: Closed-loop power control mode<br>0b01: Reserved<br>0b10: Open-loop power control passive mode<br>0b11: Open-loop power control active mode |
|   Start frame | 6LSBs of frame number when the indicated power control mode is activated. When it is same with the current frame number, the mode change shall be applied from the current frame. |
|   If(Power control mode change==0){ | |
|     Power adjust$_{Data}$ | Power correction term with respect to data burst |
|     Power adjust$_{Control}$ | Power correction term with respect to control burst |
|   }else{ | |
|   Offset_BS$_{perMS}$ | Singed integer, which expresses the change in power level(in multiples of 0.25 dB) that the MS shall apply to the open-loop power control formula |
|   } | |
| } | |

In Table 3, 'Power adjust$_{Data}$' indicates a power correction term (or a power correction level) with respect to the data burst, and 'Power adjust$_{Control}$' indicates a power correction term (or a power correction level) with respect to the control burst. The power correction term with respect to the data burst may be offset information instructing to increase or decrease transmission power of the uplink data burst by certain units. The power correction term with respect to the control burst may be offset information instructing to increase or decrease transmission power of the uplink control burst by certain units. The power correction term with respect to the control burst may be expressed by a difference value with respect to the power correction term with respect to the data burst. Alternatively, the power correction term with respect to the control burst may instruct to increase or decrease transmission power by certain units and express the power correction term with respect to the data burst as a difference value with respect to the power correction term with respect to the control burst.

In a situation that the power control mode changes as the power correction term (Power adjust$_{Data}$) with respect to the data burst and the power correction term (Power adjust$_{Control}$) with respect to the control burst are included in the PMC message, transmission power can be controlled by discriminating the data burst and the control burst.

The UE changes the power control mode according to the PMC message (S220).

The UE controls transmission power of the data burst and the control burst by using the power correction term (Power adjust$_{Data}$) with respect to the data burst and the power correction term (Power adjust$_{Control}$) with respect to the control burst (S230). When the power control mode is changed from the open-loop power control mode to the closed-loop power control mode, the UE can control transmission power of the data burst and the control burst by using one of Equation 1 to Equation 4.

The UE transmits data with the controlled transmission power (S240). User data may be transmitted on the uplink data burst and the control information may be transmitted on the uplink control burst. At this time, the data burst and the control burst may be transmitted each with different transmission power.

Every function as described above can be performed by a processor such as a micro-processor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of controlling uplink power in a wireless communication system, the method comprising:
receiving a power control offset with respect to a data burst including user data from a base station;
receiving a power control offset with respect to a control burst including control information from the base station; and
controlling transmission power of the data burst and transmission power of the control burst according to the power control offset with respect to the data burst and the power control offset with respect to the control burst,
wherein the transmission ($P_{new(Data)}$) of the data burst is expressed by the equation shown below:

$$P_{new(Data)}=P_{last}+(C/N_{new}-C/N_{last})-10\log_{10}(R_{new})-10\log_{10}(R_{last}))+\text{Offset}_{Data}$$

wherein $P_{last}$ is transmission power of a previously transmitted data burst, $C/N_{new}$ is a carrier-to noise ratio with respect to a determined modulation scheme, $C/N_{last}$ is a carrier-to-noise ratio with respect to a previously used modulation scheme, $R_{new}$ is the number of repetitions with respect to the determined modulation scheme, $R_{last}$ is the number of repetitions with respect to the previously used modulation scheme, and $\text{Offset}_{Data}$ is an accumulation of power control offsets with respect to the data burst.

2. The method of claim 1, wherein the transmission power ($P_{new(Control)}$) of the control burst is expressed by equation shown below:

$$(P_{new(Control)})=P_{last}+\text{Offset}_{Control}$$

wherein $P_{last}$ is transmission power of a previously transmitted control burst, and $\text{Offset}_{Control}$ is a power control offset with respect to the control burst.

3. The method of claim 1, wherein the transmission power ($P_{new(Data)}$) of the control burst is controlled based on equation shown below:

$$P_{new(Control)}=P_{last}+(C/N_{new}-C/N_{last})-(10\log_{10}(R_{new})-10\log_{10}(R_{last}))+\text{Offset}_{Control}$$

wherein $P_{last}$ is transmission power of a previously transmitted control burst, $C/N_{new}$ is a carrier-to-noise ratio with respect to a determined modulation scheme, $C/N_{last}$ is a carrier-to-noise ratio with respect to a previously used modulation scheme, $R_{new}$ is the number of repetitions with respect to the determined modulation scheme, $R_{last}$ is the number of repetitions with respect to the previously used modulation scheme, and $\text{Offset}_{Control}$ is an accumulation of power control offsets with respect to the control burst.

4. A method of controlling uplink power in a wireless communication system, the method comprising:
receiving a power control mode change message indicating a power control mode is changed from a closed-loop power control scheme to a open-loop power control scheme or from the open-loop power control scheme to the closed-loop power control scheme;
changing the power control mode according to the power control mode change message; and
controlling transmission power of a data burst and transmission power of a control burst according to the power control mode change message,
wherein the power control mode change message comprises a power control offset with respect to a data burst including user data and a power control offset with respect to a control burst including control information, and
wherein the transmission power ($P_{new(Data)}$) of the data burst is expressed by the equation shown below:

$$P_{new(Data)}=P_{last}+(C/N_{new}-C/N_{last}-(10\log_{10}(R_{new})-10\log_{10}(R_{last}))+\text{Offset}_{Data}$$

wherein $P_{last}$ is transmission power of a previously transmitted data burst, $C/N_{new}$ is a carrier-to noise ratio with respect to a determined modulation scheme, $C/N_{last}$ is a carrier-to-noise ratio with respect to a previously used modulation scheme, $R_{new}$ is the number of repetitions with respect to the determined modulation scheme, $R_{last}$ is the number of repetitions with respect to the previously used modulation scheme, and $\text{Offset}_{Data}$ is an accumulation of power control offsets with respect to the data burst.

* * * * *